United States Patent [19]

Shiroishi et al.

[11] Patent Number: 4,883,711
[45] Date of Patent: Nov. 28, 1989

[54] MAGNETIC RECORDING MEDIUM

[75] Inventors: Yoshihiro Shiroishi, Hachiouji; Sadao Hishiyama, Sayama; Hiroyuki Suzuki, Kawasaki; Tomoyuki Ohno; Yoshibumi Matsuda, both of Kokubunji; Kazumasa Takagi, Tokyo; Norikazu Tsumita, Kanagawa; Yasushi Kitazaki, Odawara; Masaki Ohura, Odawara; Sadanori Nagaike, Odawara, all of Japan

[73] Assignee: Hitachi, Ltd., Tokyo, Japan

[21] Appl. No.: 133,357

[22] Filed: Dec. 15, 1987

[30] Foreign Application Priority Data

Dec. 24, 1986 [JP] Japan .................. 61-306419

[51] Int. Cl.4 .............................. G11B 5/64
[52] U.S. Cl. ................... 428/336; 427/131; 428/611; 428/694; 428/900
[58] Field of Search ............. 427/131; 428/695, 408, 428/336, 900, 694

[56] References Cited

U.S. PATENT DOCUMENTS

| Re. 32,464 | 7/1987 | Aine | 428/900 |
|---|---|---|---|
| 4,411,963 | 10/1983 | Aine | 428/900 |
| 4,477,488 | 10/1984 | Sugita | 427/131 |
| 4,503,125 | 3/1985 | Nelson | 428/695 |
| 4,608,297 | 8/1986 | Shimada | 428/693 |
| 4,647,494 | 3/1987 | Meyerson | 428/446 |
| 4,707,756 | 11/1987 | Futamoto | 428/900 |
| 4,713,279 | 12/1987 | Fujiwara | 427/131 |
| 4,713,288 | 12/1987 | Kokaku | 428/695 |
| 4,717,592 | 1/1988 | Nagao | 427/131 |
| 4,786,553 | 11/1988 | Shiroishi et al. | 428/336 |

FOREIGN PATENT DOCUMENTS 258727 12/1985 Japan .
051023 3/1987 Japan .

Primary Examiner—Paul J. Thibodeau
Attorney, Agent, or Firm—Antonelli, Terry & Wands

[57] ABSTRACT

A magnetic recording medium in which a non-magnetic intermediate layer made of an alloy substantially composed of at least one element selected from the group consisting of Zr, Hf, Ta, Ti and Nb is disposed between a magnetic layer formed on a substrate and a non-magnetic overcoat layer formed on the magnetic layer. Since the impact shock resistance and the vibration resistance of the magnetic recording medium can be improved and the head-medium spacing of the magnetic disc apparatus can be decreased extremely by disposing the non-magnetic intermediate layer, it can provide a increase in the recording density, particularly, in a thin film type magnetic recording medium using a metallic magnetic thin film or metal oxide thin film as the magnetic layer. It can also improve the corrosion resistance in the case of a metallic magnetic thin film type medium.

9 Claims, 4 Drawing Sheets

MAGNETIC RECORDING MEDIUM

BACKGROUND OF THE INVENTION

The present invention concerns a magnetic recording medium for use in magnetic disc apparatus, etc. and, particularly, it relates to a magnetic recording medium of high reliability and high performance suitable for high density recording and having excellent shock resistance, vibration resistance, corrosion resistance and wear resistance.

As magnetic recording media for use in high density recording, those using metallic magnetic thin films or sputtered $\gamma$-$Fe_2O_3$ thin films have been proposed as described in Japanese Patent Publication Nos. Sho 54-33523 and Sho 57-16732. As Methods for forming films of such media, there have generally been used sputtering, evaporation, ion plating, etc. As the demand for high recording density has increased more and more in recent years, practical use of continuous thin film media using metallic magnetic thin films or sputtered $\gamma$-$Fe_2O_3$ thin films has begun including those for medium- or small-sized disc apparatus.

For attaining high density recording, it is necessary that the distance between the head and the medium of such a high performance magnetic disc apparatus (head-medium spacing) be decreased to as small as less than 0.3 $\mu$m, which increases the risk that the head and the medium are brought into contact upon read and write operation causing error or crushing between the head and the medium. In view of the above, increased shock resistance have been demanded recently and vibration resistance in the disc apparatus, particularly, magnetic disc media for use in high density recording as described above.

Although the wear resistance can be improved by disposing a lubricating non-magnetic overcoat layer on the magnetic film, it is not sufficient for imparting the necessary impact shock resistance and the vibration resistance. Since the covering power, uniformity and adhesion of the non-magnetic overcoat layer are not generally sufficient, if the medium suffers from impact shocks due to disturbance, it is partially destroyed, causes errors and, in an extreme case, undergoes crushing. Furthermore, as compared with the conventional coated medium, the metallic magnetic thin film has a drawback in view of the corrosion resistance, while the sputtered $\gamma$-$Fe_2O_3$ thin film has a drawback in view of the wear resistance. These drawbacks are caused since the non-magnetic overcoat layers are usually porous and do not substantially function as a corrosion resistance protection layer and since the non-magnetic lubrication layer such as a layer of carbon has extremely poor adhesion to the sputtered $\gamma$-$Fe_2O_3$ thin film. Thus, the lubrication layer cannot provide sufficient effect.

For the metallic thin film medium, improvement in the corrosion resistance has been attempted by disposing a corrosion resistant protection layer (intermediate layer) composed of Cr with 0.5 $\mu''$ (127 Å) thickness between a Co alloy magnetic layer and a C non-magnetic overcoat layer as shown in the article PS-3, p.13 in the Symposium on Memory and Advances Recording Technologies Text Book, San Jose, Calif., May, 1986. However, according to the study of the inventors, the Cr film of about 100 Å thickness is porous and not uniform and cannot be said to be sufficient as a corrosion resistant protection layer, and no remarkable effect is recognized by the disposition of the Cr layer in view of the wear resistance and the impact shock resistance. Thus, improvement in these characteristics has posed a serious problem. Further, aside from Cr, it has been described in Japanese Patent Laid-Open No. Sho 61-199241 that an improvement can be obtained for the corrosion resistance by disposing an intermediate layer made of noble metal made of one or more of elements selected from among Ag, Au, Pt and Pt and between the protective and lubrication layer and a magnetic layer. However, since the noble metal intermediate layer is soft and poor in the adhesion as compared with Cr, Si, etc., it has been considered unsuitable in view of the wear resistance and impact shock resistance. In addition, these noble metals are expensive bringing about problems for practical use. Separately, while similar structures have been studied also in iron oxide type media, they are considered insufficient in view of wear resistance, impact shock resistance and the vibration resistance, for which further improvements have been demanded.

SUMMARY OF THE INVENTION

The object of the present invention is to provide a magnetic recording medium of high reliability and high performance which is inexpensive, excellent in impact shock resistance and vibration resistance, and which exhibits high corrosion resistance for the metallic magnetic thin film medium and high wear resistance for the metal oxide or metal nitride thin film medium.

The foregoing object can be attained in a magnetic recording medium having a non-magnetic overcoat layer in which at least one non-magnetic intermediate layer made of at least one element selected from the group consisting of Zr, Hf, Ta, Ti and Nb or an alloy substantially composed of such element is disposed between the magnetic layer and the non-magnetic layer.

In this case, it is desirable that the magnetic layer is a metallic magnetic thin film mainly composed of Co or metal oxide thin film or metal nitride thin film. Further, it is particularly preferred in view of the read and write characteristics to define the film thickness of the non-magnetic intermediate layer from 20 to 500 Å, preferably, from 50 to 200 Å, as well as to define the total layer thickness of the non-magnetic overcoat layer and the nonmagnetic intermediate layer from 100 to 1000 Å. In view of the wear resistance, it is desirable that the film thickness of the non-magnetic overcoat layer is greater than that of the non-magnetic intermediate layer. It is further preferred that the magnetic layer comprises a metallic magnetic thin film substantially composed of a Co-Ni-Zr, Co-Ni-Hf, Co-Cr-Zr or Co-Cr-Hf, or a metal oxide magnetic thin film substantially composed of $\gamma$-$Fe_2O_3$. Further, it is more desirable in view of the reliability that the non-magnetic intermediate layer is formed with either or both of Zr and Hf, or an alloy substantially composed of Zr and Hf. In this case, it is particularly desirable in view of the corrosion resistance and the adhesion that the alloy substantially composed of one of Zr, Ti and Hf is an alloy containing at least one of Pt, Pd, Rh, Ir, Ru and Os or an alloy thereof in an amount from 0.01 at % to 1 at %, or an alloy containing from 0.1 wt % to 1 wt % of Mo or from 0.1 wt % to 1 wt % of Ni. The layer may comprise a plurality of layers of different compositions. Further, it is more desirable in view of the corrosion resistance and read and write characteristics that the metal magnetic alloy is a Co-based alloy containing from 30 to 48 at % of Ni based on Co and from 3 at % to 12 at % of Zr, Hf or the alloy thereof based on the total amount of Co-Ni. It is particularly desired in view of the magnetic properties and the adhesion to dispose a non-magnetic alloy layer made of one of Cr, Mo, W, Si, Ti, Ge or C or an alloy substantially composed of one of them, with from 100 to 500 Å thickness, between a magnetic layer and a substrate.

DETAILED DESCRIPTION OF THE PREFERRED EMBODIMENTS

Figure 2:
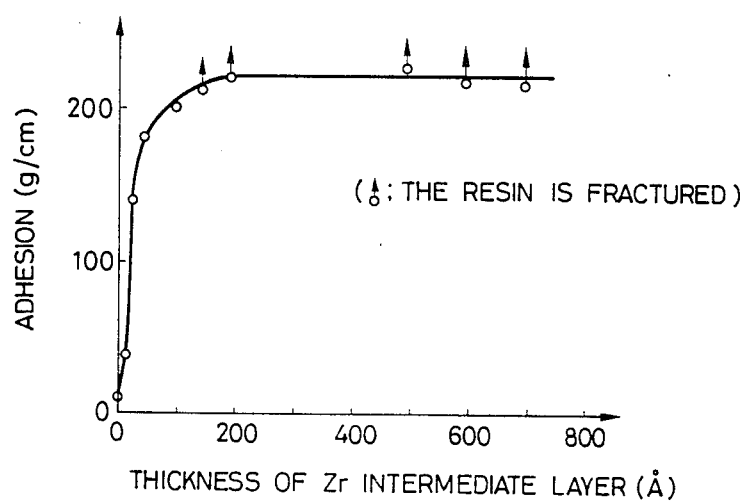
FIG. 2 is a view showing a relationship between the adhesion and the thickness of a Zr intermediate layer.
Figure 3:
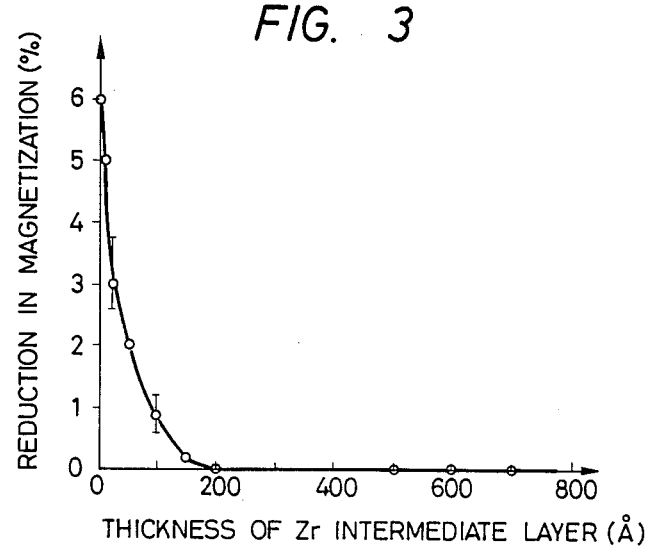
FIG. 3 is a view showing a relationship between the corrosion resistance and the thickness of a Zr intermediate layer.

The foregoing effects can be obtained by the following functions. On an Al alloy substrate applied with alumilite treatment of 89 mm$\phi \times$ 1.9 mmt, $Fe_3O_4$ of 0.16 $\mu$m thickness was formed by using an Fe target containing 3% Co in an Ar gas containing 4% $O_2$ (20 mTorr) at 5 W/cm$^2$ by means of reactive sputtering. After applying heat treatment of 280° C. for 4 hours in air to form a $\gamma$-$Fe_2O_3$ film, the surface was sputter etched, Zr was formed, under Ar gas pressure of 10 mTorr and 3 w/cm$^2$, to the thickness of 10, 20, 50, 100, 150, 200, 500, 600 and 700 Å, a C film of 350 Å was finally formed to prepare magnetic discs, which were evaluated for adhesion, impact shock resistance and wear resistance. For comparison, the adhesion, impact shock resistance and wear resistance were also evaluated for magnetic discs in which C films were formed directly, i.e., not by way of Zr on the magnetic films. At first, a polyimide film was bonded to a disc by means of an epoxy type adhesive and the polyimide film was stretched to evaluate the adhesion (peel test). In the case of not disposing the Zr film, the adhesion was as small as about 10 g/cm, whereas the adhesion was abruptly increased by disposing Zr to a film thickness of greater than 20 Å as shown in FIG. 2. In this case, it is more preferred to increase the Zr film thickness to greater than 50 Å in view of the practical use considering the adhesion strength. The effect is a obtained since Zr is highly chemically active element and each of the layers was brought into reaction at the interface between each of C and Zr, and Zr and the magnetic film when subjecting the magnetic disc to Auger Electron Spectroscopy (AES), and it is considered that this can improve the adhesion. The same effect was also recognized when using Hf, Ta, Ti and Nb as the intermediate layer.

The magnetic discs as described above were mounted to a disc apparatus, to which impact shock at 5-300 G was applied and the impact shock resistance was evaluated. In the case of not disposing the Zr intermediate layer, if impact shock at 20-30 G was applied during operation, error resulted or the medium was crushed upon reading, whereas the impact shock resistance was improved to greater than 100 G by disposing a Zr intermediate layer with film thickness of greater than 20 Å. However, if the thickness of the Zr film is increased to greater than 500 Å, cracks may result in the Zr film per se since it is relatively fragile. Accordingly, it is desirable that the thickness of the Zr film is set to less than 500 Å, preferably, less than 200 Å, and most preferably, 20 to 100 Å.

For the comparison, examination was also made for the case of disposing Si, Au, Ag, Pt and Pd as an intermediate layer to the thickness of 50, 100, 200 and 400 Å respectively, but the impact shock resistance was about 30–40 G and only a slight effect could be recognized.

Further, when the wear resistance property of the magnetic discs was evaluated by a sapphire sphere-shaped slider at 3600 rpm, wear-resistance of greater than 50 k pass was shown in the case of disposing the Zr film of 20 Å or greater. In the case of not disposing the Zr intermediate layer, film was crushed by 2-3 k pass. While the foregoing effect could also be recognized in the case of using Hf, Ta, Ti, Nb which have a remarkable effect for improving the adhesion between C and the magnetic film as the intermediate layer, most preferred results could be obtained in the case where Zr and Hf were used as the intermediate layer.

The foregoing effects could also be recognized when Co oxide, Co nitride, Fe nitride thin film or metallic continuous film was used as the magnetic film. That is, after forming a Cr film of 4000 Å thickness, a $Co_{0.60}Ni_{0.35}Zr_{0.05}$ magnetic film, or a $Co_{0.65}Ni_{0.30}Zr_{0.05}$ magnetic film or a $Co_{0.56}Ni_{0.38}Zr_{0.06}$ magnetic film of 600 Å film thickness on an Al alloy substrate with 130 mm$\phi$ outer diameter plated with NiP to 15 $\mu$m and subjected to mirror finish polishing at the substrate temperature of 170° C. and the Ar pressure of 15 mTorr and the deposition power density of 1 W/cm$^2$, a C film of 45 Å thickness was formed as a non-magnetic overcoat layer by way of Zr films of 0, 10, 20, 50, 100, 150, 200, 500, 600 and 700 Å film thickness respectively as the non-magnetic intermediate layer to prepare magnetic discs, which were evaluated for adhesion, impact shock resistance, wear resistance and corrosion-resistance. For the adhesion, all of the discs were ruptured at the inside of the resin upon peel test irrespective of the presence or absence of the Zr intermediate layer to show an adhesion of greater than 210 g/cm. Since the reactivity between the C film and the metallic magnetic film was higher than the reactivity between the C film and the oxide magnetic film, no difference was recognized in the peel test.

However, by the scratch test using a diamond point, a result showing that the adhesion was higher in the case of disposing the Zr intermediate layer was obtained, although not quantitatively. In view of the above, when the impact shock resistance was actually evaluated, the impact shock resistance was improved to greater than 150 G when the thickness of the Zr film was increased to greater than 20 A as recognized in the case of $\gamma$-$Fe_2O_3$ medium. The thickness of the Zr film was also desired to be less than 500 Å and, more preferably, less than 200 Å as described above. In the wear-resistance evaluation using the sapphire spherical shaped slider, a disc having Zr film of greater than 20 Å thickness showed satisfactory characteristics of greater than 50 k pass.

In the case of a metallic medium, while there was a drawback of if being easily corrosive as compared with the γ-Fe$_2$O$_3$ medium, a remarkable effect was also obtained for the corrosion resistance in the case of disposing the Zr intermediate layer. Namely, as a result of the corrosion resistance evaluation test for the magnetic disc comprising a Co$_{0.65}$Ni$_{0.30}$Zr$_{0.05}$ magnetic film by salt water spray using an aqueous 1 mol % NaCl solution for 30 hours, pitting corrosion occurred through micro pores on a thin film in the case of not disposing the Zr intermediate layer to reduce the magnetization of the medium by 6%, whereas the corrosion resistance was remarkably improved in the case of increasing the thickness of the Zr film to greater than 20 Å. Considering the reproducibility, the thickness of the Zr film is desirably greater than 50 Å. As a result of analysis by Auger Electron Spectroscopy and analysis by an anodic polarization technique, it was found that the foregoing effect for the corrosion resistance is due to the fact that Zr forms uniform and dense passivation films. The foregoing effect was also recognized for Co$_{0.56}$Ni$_{0.38}$Zr$_{0.06}$, Co$_{0.50}$Ni$_{0.35}$Zr$_{0.05}$ magnetic films. In the case of disposing the intermediate layer of Cr and Si with the film thickness of 50, 100 and 200 Å prepared for the comparison, the effect regarding the improvement in corrosion resistance was extremely poor.

As described above, it was found that the impact shock resistance, wear resistance and corrosion resistance of a media can be improved significantly also in the case of a metallic medium by disposing a non-magnetic intermediate layer made of zirconium between a magnetic member and a non-magnetic overcoat layer (C film) and setting the film thickness to between 20 and 500 Å and, preferably, between 50 and 200 Å.

Figure 5:
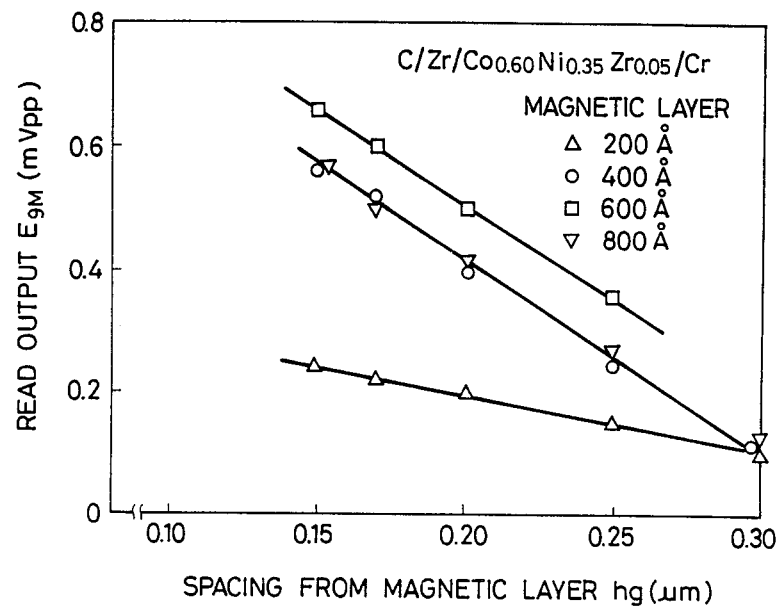
FIG. 5 is a view showing the output dependence on the spacing.

The rear and write characteristics of the medium will be explained hereinafter. After forming a Cr film to 5000 Å thickness by means of DC magnetron sputtering under the Ar pressure of 15 mTorr and a power density of 1 W/cm$^2$ to an Al alloy substrate applied with 11 wt % P-Ni plating and polished so as to form scratches in the circumferential texture to a surface roughness (Ra) of 40 Å, magnetic films of Co$_{0.60}$Ni$_{0.35}$Zr$_{0.05}$ with film thickness of 200, 400, 600 and 800 Å, a Zr film of 70 Å thickness and a C of 430 Å film thickness were continuously formed to prepare magnetic discs. Then, the read and write characteristics of the discs were evaluated at a head-to-medium velocity of 20 m/s using a Mn-Zn ferrite head with the effective gap length of 0.5 μm, the track width of 30 μm and number of turns of 14. FIG. 5 shows a relationship between the read output at 9 MHz and the distance between the magnetic surface and the head (spacing). It can be seen from the figure that the read output is reduced as the spacing becomes greater. Particularly, for attaining a high output and signal-to-noise ratio S/N, it is desirable that the spacing be less than about 0.3 μm. In this case, since about 0.2 μm of flying height is desired for the head from the surface of the protection layer in view of the flying stability, it is desirable that the total thickness of the non-magnetic overcoat layer such as C and the non-magnetic intermediate layer such as Zr is less than 1000 Å (0.1 μm) in order to obtain practically sufficient reliability and read and write characteristics. It is possible and, of course, better to define the flying height of the head to less than 0.2 μm by improving the smoothness of the medium and the stability of the magnetic head assembly. Also in this case, it is preferred to set the total thickness of the non-magnetic overcoat layer and the non-magnetic intermediate layer to less than 1000 Å and, more preferably, to less than 600 Å. While on the other hand, it is desirable that the non-magnetic overcoat layer is thicker in order to improve the wear resistance, and it is desirable that the thickness of the non-magnetic overcoat layer is greater than that of the non-magnetic intermediate layer for minimizing the spacing loss and improving the wear resistance. In order to improve the wear resistance, it is desired that the film thickness of the non-magnetic overcoat layer be greater than 50 Å and, considering that the non-magnetic intermediate layer should have a thickness from 20 to 50 Å, it is desirable that the total thickness for both of the layers is more than 100 Å.

The foregoing effects were recognized by disposing the intermediate layer not only of Zr but also of Hf, Ta, Ti, Nb or an alloy substantially composed of one of them such as 1 at % Hf-Zr, 5 at % Ta-Ti, 10 at % Cr-Ti. The effects also recognized in the magnetic film, not only with CoNiZr but also with Co-metallic magnetic thin films such as of CoNb, CoTa, CoMo, CoRe, CoTi, CoV, CoPd, CoW, CoNi, CoCr, CoPt, CoNiCr, CoNiZrRu, CoCrZr, CoCrTi, CoNiTi, CoFe, CoFeZr and CoFeCr alloys. Since the lattice matching is relatively satisfactory between the intermediate layer and the Co based magnetic layer, the intermediate thin film layer is grown relatively uniformly and densely on the magnetic film to provide an excellent function of protecting the magnetic film.

Figure 6:
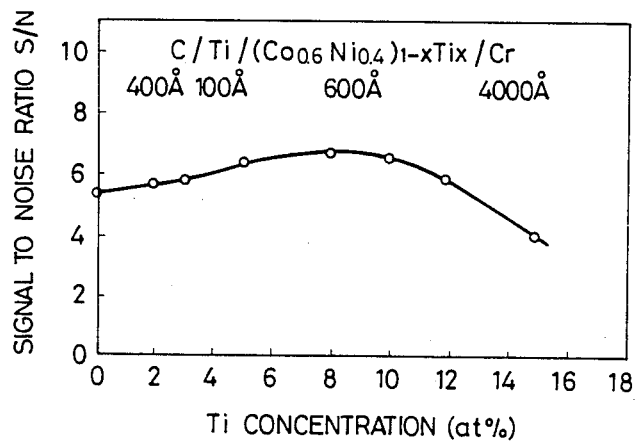
FIG. 6 is a view showing a relationship between S/N and Ti concentration.

The corrosion resistance can further be improved by constituting the magnetic layer with the metallic magnetic film substantially composed of CoNiZr, CoNiHf, CoCrZr, CoCrHf. In this case, a high S/N ratio as shown in FIG. 6 can be obtained by incorporating one of Ti, Zr and Hf or the alloy thereof by from 3 to 12 at %, which is particularly preferred (the film forming conditions, etc. are the same as in the case of FIG. 5) because a particularly high coercivity is obtained within the range of such addition amount. The ratio of Ni to Co is preferably from 10 to 60 at % and, more preferably, from 30 to 48 at % since this can provide a high output. In the same manner, the ratio of Cr to Co is preferably from 3 to 20 at %. In this case, the advantageous effect for the corrosion resistance and the wear resistance can be signficantly improved by constituting the intermediate layer with one of Zr or Hf, or an alloy mainly composed of either one of Zr and Hf, because the adhesion between the magnetic film and the intermediate layer can be increased extremely by the combination.

Figure 7:
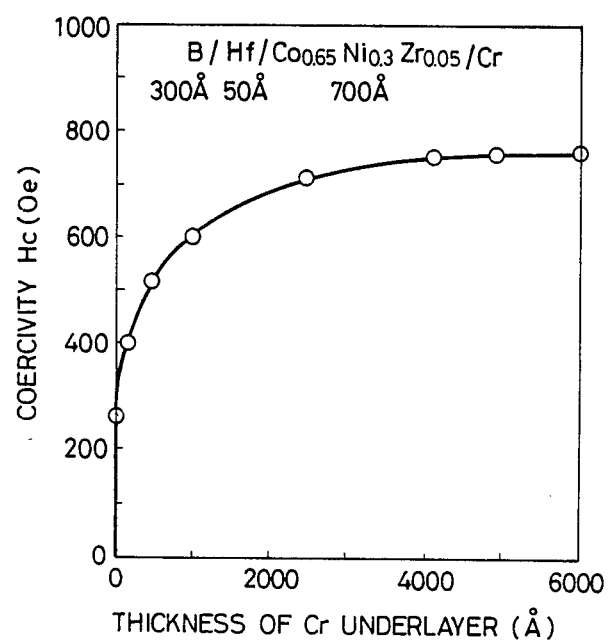
FIG. 7 is a view showing a relationship between the coercivity and the Cr underlayer thickness.

The in-plane coercivity can be increased to greater than 400 Oe by forming CoNiZr, CoNiHf, CoCrZr or CoCrHf directly on an Ni-P plated Al substrate by means of oblique evaporation, oblique sputtering, etc. However, the coercivity is less than 300 Oe by the usual sputtering and it is not preferred as the magnetic recording medium for longitudinal recording. In the case of forming the alloy by means of usual RF, DC sputtering, ion beam sputtering, etc. on a substrate of ceramics, Al alloy, Ti alloy, glass or organic film, it is possible to increase the in-plane coercivity by disposing a non-magnetic alloy underlayer made of Cr, Mo or W or an alloy substantially composed of one of them between the magnetic layer and the substrate. Cr, Co$_{0.65}$Ni$_{0.3}$Zr$_{0.05}$ of 700 Å film thickness, Hf of 50 Å film thickness and B of 300 Å film thickness were continuously formed on a glass substrate of 130 mmφ outer diameter and 1.9 mm thickness by an RF magnetron sputtering under an Ar gas pressure of 5 mTorr and a power density of 5 W/cm$^2$ to prepare magnetic discs, for which the coercivity and the relationship with the Cr underlayer were evaluated. FIG. 7 shows the result and it has been found that satisfactory coercivity of greater than 400 Oe can be obtained if the thickness of the Cr underlayer is greater than 100 Å. It is more desirable that the thickness of the Cr underlayer is greater than 500 Å. If the thickness of the Cr underlayer is made greater than 5000 Å, improvement is no longer obtained but the surface is rather roughened to undesirably reduce the flyability.

While on the other hand, when CoCrZr, CoCrHf, etc. is directly formed onto a polyimide film or the like by means of usual evaporation, sputtering, etc. a magnetic thin film with perpendicular anisotropy is formed to obtain a magnetic recording medium for perpendicular recording. However, the perpendicular orientation is poor in the Ni-plated Al alloy substrate, Ti alloy substrate, ceramic substrate, etc. In this case, it is possible to improve the perpendicular anisotropy and provide a recording medium for perpendicular recording suitable to high recording density by disposing material selected from one of Ti, Si, Ge and C or an alloy substantially composed of one of them as the underlayer for the magnetic film thereby improving the perpendicular anisotropy. The thickness of the intermediate layer is desirably from 100 to 5000 Å as in the case of using Cr, Mo, W as the intermediate layer. If the thickness of the underlayer is less than 100 Å, crystalline grains with desired crystallographic orientation can not be grown sufficiently failing to properly control the crystallographic orientation of the magnetic layer, whereas the head flyability is reduced if the layer thickness is greater than 5000 Å.

As has been described above, disposition of the underlayer is practically preferred since improvement in the write and read characteristics can be achieved. Further, in view of the wear resistance, Cr, Mo, W, Ti, Si, etc. is more desirable for the improvement of the reliability since they also have the function of improving the adhesion between the magnetic film and the substrate. The impact shock resistance, corrosion resistance, etc. can of course be improved further by disposing a non-magnetic overcoat layer on the magnetic layer by way of at least one non-magnetic intermediate layer composed of Zr, Hf, Ti, etc.

In this case, if an alloy comprising Zr, Ti or Hf incorporated with one of Pt, Pd, Rh, Ir, Ru, Os or an alloy thereof in an amount from 0.01 to 1 at % is used as the non-magnetic intermediate layer, the corrosion resistance to acid can be improved by more than about 10 times as compared with the case of using metallic element of Zr, Ti or Hf as the protection layer, because the addition of a small amount of the noble metal element to Zr, Hf, Ti increases the reducing reaction of oxygen and hydrogen ions at the surface of the alloy to several times thereby increasing the stability and the adhesion of the surface passivation film to provide a stronger protection effect. The effect is insignificant if the addition amount is less than 0.01 at %, whereas the surface becomes oxidizable excessively to rather deteriorate the effect if it is more than 1 at %. Addition of Mo, Ni, Si, Cu, Cr, Fe, W, Sn by a small amount can provide a similar effect for the improvement of the corrosion resistance but it is somewhat inferior. particularly, corrosion resistance to dusts can be improved desirably by the addition of Mo and/or Ni by from 0.1 to 1 wt %.

Although explanations have been made for the effect in the case of using the C film as the non-magnetic overcoat layer, the same effect can also be recognized in the case of using B, B$_4$C, Rh, etc. as the non-magnetic overcoat layer, because Zr, Hf, Ta, Ti, Nb are chemically active elements and provide fundamentally the same effect as above.

EXAMPLE 1

Explanation will be made to the present invention by way of one example referring to FIG. 1, in which are shown a substrate 11 selected from an Al-Mg alloy plated with NiP, NiWP or the like, an Al-Mg alloy applied with alumite treatment, glass, ceramics, etc., underlayers 12, 12' selected from Cr, Ru, Os, Mo, W, Ti, Si, Ge and C, magnetic layers 13, 13' selected from the materials shown in Table 1, non-magnetic intermediate layers 14, 14' selected from Zr, Hf, Ta, Ti, Nb and alloys substantially composed of one of them and non-magnetic overcoat layers 15, 15' selected from C, TiN, SiC, WC, TaC, TiC, B, B$_4$C, Rh, MoS$_2$. An organic lubricant layer may be disposed further on the non-magnetic overcoat layer.

TABLE 1

| Material for the Magnetic Layer | | | | | |
|---|---|---|---|---|---|
| CoNi | CoNiO | CoCr | CoRe | CoNiCr | CoPt |
| CoNiZr | CoP | CoNiP | CoNiN | CoCrZr | CoW |
| CoNiTi | CoFe | CoTi | CoCrTi | CoNiZrRu | |
| Co doped γ-Fe$_2$O$_3$ | Co$_3$N | | | | |

More specifically, after forming non-magnetic underlayers 12, 12' made of Cr with the film thickness of 3500 Å and magnetic films 13, 13' made of Co$_{0.55}$Ni$_{0.4}$Zr$_{0.05}$ with the film thickness of 650 Å on the non-magnetic substrate 11 prepared by applying a non-magnetic 12 wt % P-Ni plated layer of 12 μm thickness on an Al alloy substrate with the outer diameter of 130 mmφ, inner diameter of 40 mmφ and thickness of 1.9 mn, by means of RF magnetron sputtering at a substrate temperature 150° C., an Ar pressure of 10 mTorr and an RF power density of 4 W/cm$^2$, the non-magnetic overcoat layers 15, 15' made of C with a film thickness of 500 Å were formed by way of non-magnetic intermediate layers 14, 14' made of Zr with a film thickness of 20, 50, 100, 150, 200, 500 Å to prepare magnetic discs.

The magnetic discs were set to a magnetic disc apparatus for reading and writing and using a Mn-Zn ferrite head having the effective gap length of 0.5 μm, at the head-to-medium velocity of 13.5 m/sec and the flying height of 0.22 μm, and the impact shock resistance was evaluated. All of them showed satisfactory impact shock resistance causing neither errors nor crush upon reading against impact shock of greater than 150 G. In the case where Zr film thickness is from 50 to 200 Å, particularly good impact shock resistance to greater than 200 G was shown. For comparison, a magnetic disc with no Zr film was also manufactured for the test and the impact shock resistance was also evaluated. However, it caused error or crushing under the acceleration of 100 G. Further, all of the discs of the present example showed contact start and stop (CSS) life of greater than 30 k pass. Further, while the read and write characteristics were satisfactory as the Zr film thickness became smaller, there were no actual problems in this level when using them depending on the specification of the apparatus.

Further, the magnetic discs of the present example were set to a class 1000 thermostable and humidity stable oven at 40° C., 90% RH and the corrosion resistance was evaluated. While the missing error was increased by 20 per surface after 100 hours in the disc without the Zr film, no such increase in error was recognized in the discs with such Zr film. Particularly, the discs with a Zr film thickness of greater than 50 Å showed no increase in error and showed particularly preferable corrosion resistance even after the lapse of 200 hours.

The foregoing effect could also be achieved with an intermediate layer as made of, e.g., Hf, Ta, Ti, Nb, 1 at % Zr-Hf, 1 at % Hf-Zr, 0.1 at % Pt-Zr, 0.1 at % Pd-Zr, 0.1 at % Rh-Zr, 0.1 at % Ir-Zr, 0.1 at % Ru-Zr, 0.1 at % Os-Zr, 0.1 at % Ru-Ti, 0.1 at % Pd-Ti, 0.1 at % Pt-Hf, 0.8wt % Ni-0.1wt % Mo-Ti, 0.5wt % Mo0.5wt % Cu-Zr, zircalloy-2 (registered trademark), etc. For the corrosion resistance, the effect was particularly great in a case of using an intermediate layer made of Ti-Zr, Hf alloy incorporated with a small amount of platinum group element of from 0.01 to 1 at %. For comparison, the corrosion resistance was also evaluated for the case of using Cr as an intermediate layer and adjusting the film thickness to 50, 100, 200 and 300 Å. However, missing error was increased by 20 per surface after the lapse of 100 to 110 hours in any of the cases, and the Cr addition effect was scarcely recognized.

EXAMPLE 2

Explanation will be made to another example having the structure shown in FIG. 1. After forming nonmagnetic underlayers 12, 12 made of Cr and 30 at % Ti-Cr alloy with 2500 Å film thickness and magnetic layers 13, 13' selected from the material shown in Table 2 with the film thickness of 600 Å, on a non-magnetic substrate 11 prepared by applying a non-magnetic 11 wt % P-Ni plated layer with 15 thickness on an Al alloy substrate with the outer diameter of 130 mmφ, inner diameter of 40 mmφ and thickness of 1.9 mm, by means of DC magnetron sputtering at a substrate temperature of 180° C., under an Ar pressure of 15 mTorr and an RF power density of 2 W/cm$^2$ and then forming non-magnetic overcoat layers 15, 15' made of C with the film thickness of 400 Å by way of non-magnetic intermediate layers 14, 14' selected from Zr (99%) and Hf (98%) with the film thickness of 100 Å, solid lubricant Vydax (registered trademark) was formed by 40 Å thickness to prepare magnetic discs. All of the magnetic films were predominantly crystalline.

TABLE 2

| Material for Magnetic Layer |
| --- |
| $Co_{0.65}Ni_{0.3}Zr_{0.05}$ |
| $Co_{0.65}Ni_{0.3}Hf_{0.05}$ |
| $Co_{0.6}Ni_{0.398}Pd_{0.002}$ |
| $Co_{0.6}Ni_{0.398}Ru_{0.002}$ |
| $Co_{0.80}Cr_{0.15}Zr_{0.05}$ |
| $Co_{0.80}Cr_{0.15}Hf_{0.05}$ |
| $Co_{0.65}Ni_{0.348}Rh_{0.002}$ |
| $Co_{0.65}Ni_{0.348}Ir_{0.002}$ |
| $Co_{0.85}Pt_{0.14}Y_{0.01}$ |
| $Co_{0.65}Ni_{0.335}Zr_{0.015}$ |
| $Co_{0.7}Ni_{0.3}$ |
| $Co_{0.82}Cr_{0.18}$ |
| $Co_{0.7}Pt_{0.3}$ |
| $Co_{0.8}Ni_{0.2}$ |
| $Co_{0.6}Ni_{0.4}$ |
| $Co_{0.85}Ni_{0.13}O_{0.02}$ |
| $Co_{0.85}Cr_{0.15}$ |
| $Co_{0.8}Pt_{0.2}$ |
| $Co_{0.50}Ni_{0.45}Zr_{0.05}$ |
| $Co_{0.50}Ni_{0.45}Hf_{0.05}$ |
| $Co_{0.77}Cr_{0.18}Zr_{0.05}$ |

The magnetic discs were set to a magnetic disc apparatus for reading and writing using a thin film magnetic recording head with the effective gap length of 0.4 μm at a head-to-medium velocity of 13.5 m/s, flying height of 0.25 μm and using $Al_2O_3$-TiC as a slider, and impact shock resistance was evaluated. All of them showed no crushing against impact shock of greater than 200 G and showed satisfactory impact shock resistance. All of them showed more than 100 k pass life in the CSS test. Although the CSS life of greater than 100 k pass was shown by disposing a liquid lubricant such as Fomblin (registered trademark) instead of or together with the solid lubricant, the CSS life was about 40 k pass in the case of not disposing the lubricant. Further, any of the magnetic discs can be recorded at high density of higher than 20 kFCI at $D_{50}$.

Further, when the magnetic disc of the invention was set to a class 1000 thermostable and humidity stable oven at 60° C., 90% RH to evaluate the corrosion resistance, none of them showed increase in the missing error even after the lapse of 100 hrs. Particularly, the magnetic discs in which Zr, Hf was added to the magnetic layer showed no increase in errors after the lapse of 200 hours from the test and showed particularly satisfactory corrosion resistance.

While the effect could also be recognized in the case of using the non-magnetic intermediate layer made of Ti, Ta, Nb, the effect was particularly significant in the cause of using an intermediate layer made of Zr, Hf.

EXAMPLE 3

A further example will be explained with the structure shown in FIG. 1.

After forming non-magnetic underlayers 12, 12' made of material selected from Cr, Mo, W with the film thickness of 2000 Å and a magnetic layer made of a material selected from the alloys shown in Table 3 with a film thickness of 400 Å on a non-magnetic substrate 11 prepared from an Al alloy substrate with the outer diameter of 80 mmφ and a thickness of 1.9 mm by applying a non-magnetic 12 wt % P-Ni plated layer to 10 μm thickness and formed with fine scratches of circumferential roughness for the center line (Ra) of 70 Å in the head running direction at the surface, by means of DC magnetron sputtering at a substrate temperature of 120° C., an Ar pressure of 30 mTorr and a power density of 3 W/cm$^2$ and further forming nonmagnetic overcoat layers 15, 15' made of material selected from $B_4C$, C, Rh with the film thickness of 320 Å by way of non-magnetic intermediate layers 14, 14' selected from 1 at % Hf-Zr, 0.1 at % Pd-Zr, 0.1 at % Pt-Zr, 0.5 wt % Ni-0.3 wt % Mo-Zr with 80 Å film thickness, a solid lubricant Vydax (registered trademark) and a liquid lubricant Fomblin (registered trademark) were formed in total of 60 Å thickness to prepare magnetic discs. In this case, all of the magnetic membranes were predominantly crystalline. Further, in the case of predominantly amorphous films, the coercivity was low and no satifactory read-and-write characteristics were obtained.

TABLE 3

| Material for Magnetic Layer |
| --- |
| $Co_{0.56}Ni_{0.38}Zr_{0.06}$ |
| $Co_{0.60}Ni_{0.35}Zr_{0.05}$ |
| $Co_{0.65}Ni_{0.3}Zr_{0.05}$ |
| $Co_{0.80}Cr_{0.15}Zr_{0.05}$ |
| $Co_{0.78}Cr_{0.17}Zr_{0.05}$ |
| $Co_{0.75}Fe_{0.20}Zr_{0.05}$ |
| $Co_{0.65}Fe_{0.30}Zr_{0.05}$ |

TABLE 3-continued

| Material for Magnetic Layer |
| --- |
| $Co_{0.80}Pt_{0.15}Zr_{0.05}$ |
| $Co_{0.56}Ni_{0.38}Hf_{0.06}$ |
| $Co_{0.60}Ni_{0.35}Hf_{0.05}$ |
| $Co_{0.65}Ni_{0.3}Zr_{0.05}$ |
| $Co_{0.92}Mo_{0.04}Zr_{0.04}$ |
| $Co_{0.92}W_{0.04}Zr_{0.04}$ |
| $Co_{0.92}Ta_{0.04}Zr_{0.04}$ |
| $Co_{0.56}Ni_{0.38}Zr_{0.055}Pd_{0.005}$ |
| $Co_{0.60}Ni_{0.35}Pt_{0.005}Zr_{0.045}$ |
| $Co_{0.60}Ni_{0.35}Ti_{0.05}$ |
| $Co_{0.92}V_{0.04}Zr_{0.04}$ |
| $Co_{0.92}Nb_{0.04}Zr_{0.04}$ |
| $Co_{0.92}Ta_{0.04}Zr_{0.04}$ |
| $Co_{0.56}Ni_{0.36}Zr_{0.04}Mo_{0.04}$ |
| $Co_{0.60}Ni_{0.31}Zr_{0.04}Cr_{0.05}$ |
| $Co_{0.625}Ni_{0.30}Cr_{0.075}$ |
| $Co_{0.92}Ti_{0.04}Zr_{0.04}$ |
| $Co_{0.85}Ru_{0.10}Zr_{0.05}$ |
| $Co_{0.85}Os_{0.10}Zr_{0.05}$ |
| $Co_{0.85}Sm_{0.10}Zr_{0.05}$ |
| $Co_{0.70}Ni_{0.20}Cr_{0.10}$ |
| $Co_{0.65}Ni_{0.3}Zr_{0.045}Os_{0.005}$ |
| $Co_{0.60}Ni_{0.35}Zr_{0.045}Ru_{0.005}$ |
| $Co_{0.92}Rh_{0.04}Zr_{0.04}$ |
| $Co_{0.92}Ir_{0.04}Zr_{0.04}$ |
| $Co_{0.92}Pd_{0.04}Zr_{0.04}$ |
| $Co_{0.86}Al_{0.10}Zr_{0.04}$ |
| $Co_{0.85}Cu_{0.10}Zr_{0.05}$ |

The magnetic discs were set to a magnetic disc apparatus for reading and writing using a thin film magnetic head with an effective gap length of 0.4 μm at a head-to-medium velocity of 9 m/s and flying height of 0.22 μm, and the impact shock resistance was evaluated. All of them showed high impact resistance of greater than 120 G. They showed excellent corrosion resistance greater by one digit as compared with the case of not using the non-magnetic intermediate layer in the corrosion resistant test within a class 1000 thermostable and humidity stable oven at 80° C., 90% RH. No increase was recognized for the missing errors even after the lapse of 100 hours, and a particularly preferred corrosion resistance was shown.

Evaluation was also made in the case of forming only the magnetic layer by means of an RF sputtering method or forming the non-magnetic overcoat layer by means of RF magnetron sputtering and it was found that similar results could also be obtained. Further, although a solid lubricant or liquid lubricant may be used alone, better wear resistance could be obtained by using them in combination. In this case, a polar lubricant represented by the molecular formula: $C_nH_{2n+1}OH$, $C_nH_{2n+1}COOH$, $C_nH_{2n-1}COOH$ shows lower adhesion and is more preferred as compared with the non-magnetic lubricant, in which n=positive integer of 1, 2, 3, - - -.

EXAMPLE 4

A further example will be explained with the structure shown in FIG. 1. After forming Ti under layers 12, 12' of 12 μm thickness on a non-magnetic substrate prepared from an Al alloy substrate with the outer diameter of 224 mmφ and the thickness of 2 mm by applying a non-magnetic Ni-W-P plated layer of 15 μm thickness or an Al alloy substrate applied with alumilite treatment, by means of RF sputtering at a substrate temperature of 150° C. and an RF power density of 6 W/cm² and forming further thereover, $(Fe_{0.96}Co_{0.04})_3O_4$ of 0.16 μm film thickness by sputtering $Fe_{0.96}Co_{0.04}$ using 4% $O_2$ Ar gas at a gas pressure of 15 mTorr, heat treatment was applied in air at 300° C. for 3 hours to form magnetic layers 13, 13' of $\gamma$-$(Fe_{0.96}Co_{0.04})_2O_3$. Then, non-magnetic intermediate layers 14, 14' made of Zr with a film thickness of 50, 100, 150 Å and the non-magnetic overcoat layers 15, 15' made of C with a film thickness of 350 Å, 450 Å were formed under Ar pressure of 10 mTorr and a power density of 5 W/cm² by means of DC magnetron sputtering to prepare magnetic discs.

The magnetic discs of this embodiment were set to a magnetic disc apparatus for reading and writing using a thin film head with the effective gap length of 0.5 μm at a head-to-medium velocity of 30 m/s and flying height of 0.16 μm and the impact shock resistance was evaluated. All of them showed no crush and showed satisfactory impact shock resistance to the impact shock of greater than 150 G. Further, when a CSS test was carried out for the magnetic discs, they showed CSS life of greater than 3, 6, 10 k pass along with the film, thickness of the C film respectively. However, the magnetic discs without disposing the Zr film were crushed instantly in the CSS test and showed no level capable of evaluation for the impact resistance.

While the recording density characteristics for each of the discs were better as the total film thickness of Zr and C were smaller, there was no practical problems in the case if the total film thickness was greater than 600 Å. For the corrosion resistance, there were no problems at all for any of the discs. While the similar effect could also be recognized in the case of using Hf, Ti, Ta, Nb as the non-magnetic intermediate layer, the effect was highest in the case of using the Zr intermediate layer and lowest in the case of using the Ti intermediate layer.

While the metallic substrate was used for the substrate 11 in the foregoing embodiment, a similar effect could also be obtained with an organic substrate such as polyimide, a glass substrate, or a ceramic substrate such as $Al_2O_3$ or $Al_2O_3$-TiC. Further, the same results were shown in the case of using C as the non-magnetic overcoat layer, and a similar effect could also be obtained in the case of using B, $B_4C$ and Rh.

EXAMPLE 5

Figure 4:
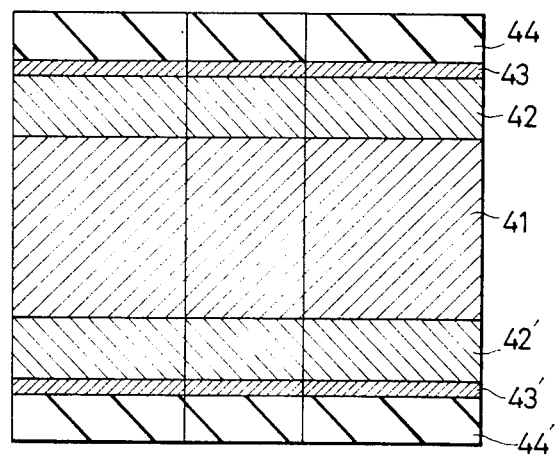
FIG. 4 is a cross-sectional view of another embodiment of the present invention.

FIG. 4 shows a still further example, in which are shown a substrate 41 selected from an Al alloy plated with NiP, etc., Ti-alloy, brass, Al alloy applied with alumilite treatment, glass, ceramic and organic materials, highly coercive magnetic films 42, 42' made of material selected from Co alloy, Fe alloy, Ni alloy, rare earth alloy such as SmCo, Fe oxide, Fe nitride, Co nitride, Co oxide, etc., non-magnetic intermediate layers 43, 43' selected from Zr, Hf, Ta, Ti, Nb and alloys substantially composed of one of them and non-magnetic overcoat layers 44, 44' selected from C, $B_4C$, Cr and Rh.

Magnetic layers 42, 42' selected from $Co_{0.75}Pt_{0.2}Ta_{0.05}$, $Co_{0.7}Pt_{0.25}Zr_{0.05}$, $Co_{0.75}Re_{0.2}Nb_{0.05}$ with a film thickness of the 700 Å, non-magnetic intermediate layers 43, 43' made of Hf with a film thickness of 80 Å and a non-magnetic overcoat layer made of C or $B_4C$ with a film thickness of 400 Å were formed on a non-magnetic substrate 41 prepared from an Al alloy substrate with the outer diameter of 89 mmφ and the thickness of 1.8 mm by forming a non-magnetic 11.5 wt % P-Ni plated layer with the thickness of 10 μm thereon, by means of RF sputtering at a substrate temperature of 200° C., an Ar pressure of 20 mTorr and a power density of 3 W/cm² to prepare magnetic discs.

The magnetic discs were set to a magnetic disc apparatus for reading and writing using a Mn-Zn ferrite head with a gap length of 0.5 μm at the head-to-medium velocity of 9 m/s and the flying height of 0.25 μm, and the impact shock resistance was evaluated. All of these showed high impact shock resistance of greater than 150 G. For the corrosion resistant test in a class 100 thermostable and humidity stable oven at 28° C. and 90% RH, they showed corrosion resistance improved by more than 10 times as compared with the case of not disposing a Zr layer, and no increase was recognized in the missing error even after a lapse of 250 hrs.

The foregoing effect could also be recognized in the medium in which CoNi, CoCr, etc. was formed only on one surface of the substrate by means of evaporation or ion beam sputtering.

EXAMPLE 6

Figure 1:
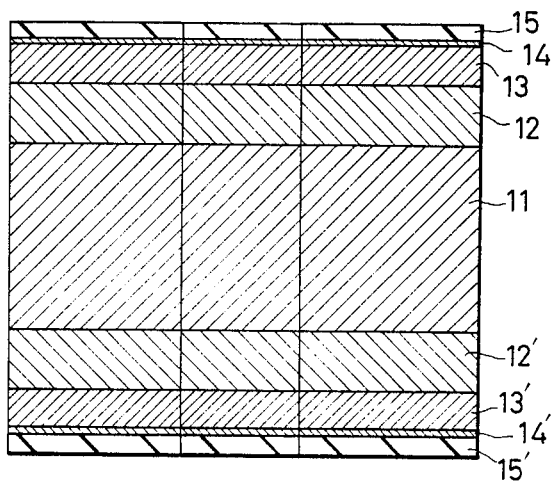
FIG. 1 is a cross-sectional view of one embodiment according to the present invention.

A further example is shown with the structure in FIG. 1.

Underlayers 12, 12' made of 10 at % Cr-Ti with a film thickness of 1000 Å, magnetic layers 13, 13' selected from materials shown in Table 4 with the film thickness of 2000 Å, non-magnetic layers 14, 14' made of 0.5 wt % Mo-0.5 wt % Cu-Zr with the film thickness of 70 Å and non-magnetic overcoat layers 15, 15' made of C with the film thickness of 330 Å were formed on a glass substrate 11 with the outer diameter of 130 mmφ and the thickness of 1.9 mm by means of conventional RF sputtering at the substrate temperature of 150° C. and RF power density of 2 W/cm$^2$ to prepared magnetic recording mediums for use in vertical magnetic recording.

TABLE 4

| Material for Magnetic Layer |
| --- |
| $Co_{0.79}Cr_{0.21}$ |
| $Co_{0.80}Cr_{0.20}$ |
| $Co_{0.78}Cr_{0.22}$ |
| $Co_{0.88}Ti_{0.12}$ |
| $Co_{0.88}Ta_{0.12}$ |
| $Co_{0.80}V_{0.20}$ |
| $Co_{0.80}Mo_{0.20}$ |
| $Co_{0.75}Ru_{0.25}$ |
| $Co_{0.80}W_{0.20}$ |
| $Co_{0.78}Cr_{0.18}Zr_{0.04}$ |
| $Co_{0.78}Cr_{0.18}Ti_{0.04}$ |
| $Co_{0.78}Cr_{0.11}V_{0.11}$ |

The magnetic discs were set to a magnetic disc apparatus for reading and writing using a composite head with a effective gap length of 0.3 μm (a head made of Co amorphous soft magnetic alloy having high saturation magnetic flux density of about 1T near an gap portion and non-magnetic material such as Mn-Zn ferrite or $ZrO_2$ for a other portion) with the head-to-medium velocity of 14 m/s and an the flying height of 0.20 μm, and a evaluation was made for the impact shock resistance. All of them showed no crush to the impact shock of greater than 150 G and showed satisfactory impact shock resistance. Further, all of them could conduct read and write at a recording density of higher than 25 kFCI. The same results are obtained in a case where the underlayers 12, 12' are made of Ge, Si, C with a film thickness of 200 Å.

According to the present invention, since the adhesion between the non-magnetic overcoat layer with the lubricating and protecting property and the magnetic film can be increased and the surface of magnetic film can be protected uniformly, it can provide the effects capable of significantly improving the impact shock resistance, wear resistance and the corrosion resistance of the magnetic recording medium, and can provide a high performance magnetic recording medium with high reliability.

What is claimed is:

1. A magnetic recording medium having a magnetic layer over a substrate , a non-magnetic overcoat layer over said magnetic layer and a non-magnetic intermediate layer disposed between said magnetic layer and said non-magnetic overcoat layer, wherein said non-magnetic intermediate layer is made of an alloy substantially composed of at least one element selected from the group consisting of Zr, Hf and Ti and contains at least one element selected from the group consisting of Pt, Pd, Rh, Ir, Ru and Os in an amount from 0.01 to 1.0 at %.

2. A magnetic recording medium as defined in claim 1, wherein an underlayer comprising at least one element selected from the group consisting of Cr, Mo, W, Ti, C, Ge and Si or a non-magnetic alloy substantially composed of one of Cr, Mo, W, Ti, C, Ge and Si with a film thickness of from 100 to 5000 Å is disposed between the magnetic layer and the substrate.

3. A magnetic recording medium as defined in claim 1, wherein said magnetic layer comprises a metallic magnetic thin film substantially composed of Co.

4. A magnetic recording medium as defined in claim 3, wherein the magnetic layer is a metallic magnetic thin film substantially composed of CoNi and Zr.

5. A magnetic recording medium as defined in claim 4, wherein the metallic magnetic thin film contains Ni by from 30 to 48 at % based on Co, and Zr by from 3 to 12 at % based on the total amount of CoNi.

6. A magnetic recording medium as defined in claim 1, wherein said non-magnetic intermediate layer and said non-magnetic overcoat layer have a total thickness from 100 to 1000 Å.

7. A magnetic recording medium as defined in claim 6, wherein said non-magnetic overcoat layer has a greater thickness than said non-magnetic intermediate layer.

8. A magnetic recording medium as defined in claim 1, wherein said non-magnetic intermediate layer comprises a plurality of layers.

9. A magnetic recording medium as defined in claim 1, wherein said non-magnetic intermediate layer has a thickness from 50 to 200 Å.

* * * * *